United States Patent [19]

Kumar-Misir

[11] 4,428,733

[45] Jan. 31, 1984

[54] INFORMATION GATHERING SYSTEM

[76] Inventor: Victor Kumar-Misir, 33 Burnview Crescent, Scarborough, Ontario, Canada, M1H 1B4

[21] Appl. No.: 282,701

[22] Filed: Jul. 13, 1981

[51] Int. Cl.³ .............................................. G09B 1/00
[52] U.S. Cl. .................................. 434/363; 434/157; 434/354; 283/1 A
[58] Field of Search ............... 434/353, 363, 157, 364, 434/322, 326, 327, 338, 349; 283/1 A, 46

[56] References Cited

U.S. PATENT DOCUMENTS

| | | | |
|---|---|---|---|
| 1,436,997 | 11/1922 | McDade | 434/363 X |
| 1,500,777 | 7/1924 | Stevenson | 434/354 |
| 2,137,447 | 11/1938 | Ellis | 434/353 |
| 2,234,075 | 3/1941 | Carolin | 434/349 |
| 2,373,498 | 4/1945 | Parmenter | 434/353 |
| 3,055,118 | 9/1962 | Betancourt | 434/157 X |
| 3,242,592 | 3/1966 | Weeks et al. | 434/363 |
| 3,242,596 | 3/1966 | Smith | 434/349 |
| 3,407,513 | 10/1968 | Conn | 434/363 |
| 3,526,974 | 9/1970 | Van Derveer et al. | 434/349 |
| 4,175,339 | 11/1979 | Jones | 434/326 |

OTHER PUBLICATIONS

Health History Questionaire of Patient Care Systems, Inc. 1972, Sold Under the Trademarks ROCOM and ROCHE.

Primary Examiner—William H. Grieb
Attorney, Agent, or Firm—Rogers, Bereskin and Parr

[57] ABSTRACT

An information gathering system particularly useful for obtaining medical information from a patient, including patients which communicate in a language different from that of the doctor. The system has one or more question sheets bearing a set of questions. These questions may be medical questions written in the language of the patient. A separate answer sheet on which answers to questions on the question sheets can be indicated is provided. The answer sheet has information concerning each possible answer adjacent the location on the sheet for the answer. It is possible for this information to be in a language different from that used on the question sheet or sheets. A mechanism is preferably provided for positioning and holding the answer sheet in a predetermined position relative to the question sheets. In this way the questions are correctly positioned with respect to corresponding locations on the answer sheet for the answers to the questions so as to enable a person answering the questions to write or mark his answers at the proper locations.

28 Claims, 14 Drawing Figures

INFORMATION GATHERING SYSTEM

BACKGROUND OF THE INVENTION

This invention relates to a communication system and in particular to a system for communicating answers to a given set of questions by indicating the answer on a sheet of paper. The system is particularly suitable for use in providing answers in a language different from the language in which the questions are written.

It is often necessary to gather information from individuals without having to spend the time required to communicate directly with these individuals. For example, a doctor may need to obtain certain basic information from a new patient before handling the patient's particular health problem. Also employers when interviewing job applicants may wish to screen the applicants first to determine which particular applicants they might be interested in hiring. In order that this can be done a job applicant is often required to answer in writing a number of predetermined questions. Schools also require answers to be given to a number of questions when testing students and a number of systems are known at the present time for testing students in a manner that requires them to provide their answers in a certain manner so that the answers can be checked readily and quickly.

An example of a system for examining students is that taught in U.S. Pat. No. 2,373,498 issued Apr. 10, 1945 to M. D. Parmenter. In this system the examination paper is printed on cardboard and the cardboard carries a series of numbered questions. A relatively narrow answer sheet straddles the examination sheet and can be used initially to cover the questions. After the examination commences, the answer sheet is moved to a central panel portion of the cardboard. Numbers are printed on the answer sheet and these numbers correspond with the number of possible answers to the questions asked. One of the numbers is to be marked by the pupil as the correct one in his estimation. U.S. Pat. No. 2,373,498 also teaches the use of a cardboard having two series of questions which can be arranged on either side of the answer sleeve. With this known arrangement, it is necessary to rotate or reverse the answer sheet after doing the first series of questions in order that one can properly mark the answers for the second series of questions.

A system for gathering health related information from a patient for use by a doctor has been developed by Patient Care Systems Inc. With this system there are several question sheets which are attached together and to an underlying answer sheet. The initial sheet may provide for answers to be indicated on the same sheet. However, there are at least two question sheets wherein the answers are indicated by the patient on the answer sheet that underlies these question sheets. A right hand edge portion of the answer sheet projects outwardly from the right hand edge of the first of these question sheets. In this way, the answers to the questions on the first question sheet can be indicated at specific locations on the right hand edge portion of the answer sheet. When all of the questions on the first question sheet have been answered, the patient turns the sheet over and commences answering the questions on the second question sheet. The second question sheet is narrower than the first question sheet and its right hand edge is spaced inwardly from the right hand edge of the overlying question sheet. As a result, another column of possible answers on the answer sheet is revealed and the patient can indicate the appropriate answer to each question on the second question sheet. When all of these questions have been answered, the second question sheet is turned over and the patient may then have to answer further questions on the back of the second question sheet. When the second question sheet is turned over, all of the answer sheet is revealed including a third column of possible answers. This third column is positioned immediately to the right of the questions on the back of the second question sheet. With this system an answer summary sheet is provided immediately behind the answer sheet that is filled in by the patient. Because the completed answer sheet has a special transfer material at the locations on the answer sheet where a positive or significant answer would be indicated, such answers are automatically transferred to the answer summary sheet. After the questionnaire has been completed, all of the question sheets and the patient's answer sheet are detached from the bottom summary sheet and are discarded. The only sheet that is retained for immediate or future use is the answer summary sheet. Because the question and answer sheets are produced in an attached form, this known system is not readily adapted to a system employing question sheets in one of various languages and an answer sheet in another language.

Another system for gathering medical data is taught by U.S. Pat. No. 3,407,513 issued Oct. 29, 1968 to H. F. Conn. This system requires the use of a special data viewing machine. The patient is presented with a questionnaire strip. Depending on the answer to the question, the patient pushes one of several available buttons. If a negative response is given, the machine is able to skip or bypass all the other data or questions which are inconsequential in view of the answer. The machine automatically presents other programmed data pertinent to the analysis and records a no answer for the skipped data. Clearly the data gathering machine taught by this patent would be quite expensive and would no doubt require regular maintenance. In many cases it would not be suitable for use by doctors in their practice.

Accordingly an object of the present invention is to provide a means for gathering information quickly and easily and at a very low cost.

Another object of the invention is to provide a novel system for gathering medical information from patients for use by a doctor, and, in particular, a system which can even be used to gather information from a patient who communicates in a language that is unknown to the doctor. The present system could be used in emergency situations where it is essential to gather important medical data from a patient and a translator is not immediately available.

SUMMARY OF THE INVENTION

According to one aspect of the invention, an information gathering system comprises a question sheet having a list of questions in one language thereon; and an answer sheet on which answers to said questions can be indicated at predetermined locations, interpretive information regarding the answers being provided on said answer sheet in another language, the information for each possible answer being provided adjacent the predetermined location for the answer.

According to a further aspect of the present invention, an information gathering system comprises a question sheet bearing a set of questions; a separate answer sheet on which answers to questions on said question sheet can be indicated at predetermined marked locations, interpretive information regarding each possible answer being provided on the answer sheet adjacent the predetermined location for the answer; and means for releasably positioning and holding said answer sheet in a correct underlying position relative to said question sheet so that the questions are aligned with the locations on said answer sheet for the answers to said questions.

According to another aspect of the invention, an information gathering system comprises question sheets having lists of questions in one language thereon, the question sheets being arranged one on top of another and positioned so that one edge of each underlying question sheet is positioned inwardly a predetermined distance from the corresponding edge of the immediately overlying sheet. Means are provided for holding the question sheets in the aforementioned position and also permitting at least an overlying question sheet to be turned to expose an underlying question sheet. An answer sheet on which answers to questions on all the question sheets can be indicated has interpretive information set out thereon regarding the answers, this information being in another language. The answer sheet also has indicia thereon for providing answers at desired locations on the answer sheet. The system includes means for releasably retaining the answer sheet in a correct underlying position relative to the question sheets so that the questions are aligned with corresponding sections on the answer sheets for the answers to the questions.

In one embodiment, the retaining means comprises a pocket having a front section and a rear section. The front section has elongate openings formed therein to reveal the portions of the answer sheet having the indicia thereon. The front section covers up the information regarding the answers set out in the other language.

Preferred embodiments of the invention will now be described, by way of example, with reference to the accompanying drawings.

DETAILED DESCRIPTION OF PREFERRED EMBODIMENTS

The drawings illustrate an information gathering system 10 adapted for use in the gathering of medical information from a patient for use by a doctor. Although the following description will be directed to this particular system, it will be understood that the system of the invention can be used under a variety of circumstances and in fact can be used wherever there is a need to obtain answers to a number of questions from a number of persons either over a period of time or all at once. Examples of where one embodiment of the present invention can be used include the screening of job applicants for a certain job opening and also the obtaining of information from a new employee for a personnel record maintained by the employer. The system can also be employed for the conducting of school tests or for college entrance examinations. When used for the testing of students, it will probably have its greatest application where a large number of students are to be given the same test. When a large number are to be tested, the expense of arranging and printing the question and answer sheets so that they can be used with the system of the invention becomes worthwhile.

One form of the information gathering system disclosed herein could be used by insurance companies to obtain essential medical data from insurance applicants. With the information provided by the applicant, the company is able to assess the risk involved if it issues the requested insurance policy.

One or more of the embodiments of the invention disclosed herein could also be employed at airports and other points of entry into a country to gather information from visitors, immigrants and other persons wishing entry into the country. It is believed that the system of the present invention will be particularly useful for questioning persons who do not speak or read the official language or languages of the country. Providing the necessary legal safeguards are in place, the present system might also find application in the field of law enforcement or in the Courts themselves for the purpose of obtaining information necessary for police officers or Court officials to carry out their work.

According to one broad aspect of this invention, one or more question sheets are provided to the person to be questioned and the questions on these sheets are in a language spoken or read by the individual. The sheet on which the answers are provided however indicates the nature of the answer in the language of the person or persons conducting the interview or questioning. It will be appreciated that this form of the invention can be useful wherever there is a breakdown in normal means of communication because of language differences. This problem is often encountered by doctors who are presented with patients from different ethnic and cultural backgrounds. Sometimes such patients do not have a translator available to them and sometimes in emergency situations a translator cannot be located quickly enough.

Although the drawings illustrate and the following detailed description refers to the use of ordinary languages in conjunction with the present system, it will be appreciated that the system of the present invention can readily be adapted to other forms of communication. For example the question sheets could be written in braille for use by blind persons. Also the questions can be written in standard recognized phonetic renditions of a particular language. Alternatively, the phonetic equivalent can be written underneath each question on the question sheets. It is to be clearly understood that the term "language" when used herein is intended to include a form of communication as well as actual spoken language and therefore the term includes such forms as braille and a phonetic translation or equivalent.

One embodiment 10 of a system constructed in accordance with one aspect of the invention is illustrated in FIGS. 1 to 7. This system employs three question sheets 12, 14, and 16 but it will be appreciated that only one or more than three question sheets could be used with this system if desired. It has been found that three question sheets will permit the asking of a relatively large number of questions with the system of the invention and yet the system is not too complex for use by ordinary individuals, including individuals suffering from health problems provided of course they are able to read and understand printed questions and indicate the answer on a sheet of paper by means of a pen or a pencil. Each of the question sheets bears a different set of questions and the question sheets are superimposed one on top of another. The question sheets are arranged so that one edge (which is the right hand edge in the illustrated embodiment) of each underlying question sheet is positioned inwardly a predetermined distance from the corresponding edge of the overlying sheet. This relationship can be seen from an examination of FIGS. 1 to 3. The top sheet 12 has its right hand edge located at 18 while the next underlying sheet 14 has its right hand edge located at 20. It will be noted that the edge 20 is located further from the right hand edge 21 of the illustrated folder 22 than is the right hand edge 18. The right hand edge 24 of the third question sheeet 16 is located even further from the edge 21 of the folder.

In addition to providing means for protecting the question sheets and the other sheet or sheets used with the system of the invention, the folder 22 provides means for holding the question sheets in the required superimposed position. The folder 22 is preferably provided with a front cover 26 and a back cover 28, both of which can be constructed of Bristol board or any other durable material. The front and rear covers can for example be made from a plastic sheet material or from metal sheet. The front and back covers are joined along their left hand edge portions at 30. The front cover 26 can be folded back in the manner shown in FIG. 4 if desired. In one embodiment the front and back covers are joined together by means of a number of staples distributed along the edge portion 30. Because the question sheets 12, 14, and 16 extend into the region of edge portion 30, they also are held together by these staples. It will be appreciated that there are a variety of mechanical fasteners available for holding together the folder and question sheets, for example, short rivets or even paper spikes can be used.

Figure 5:
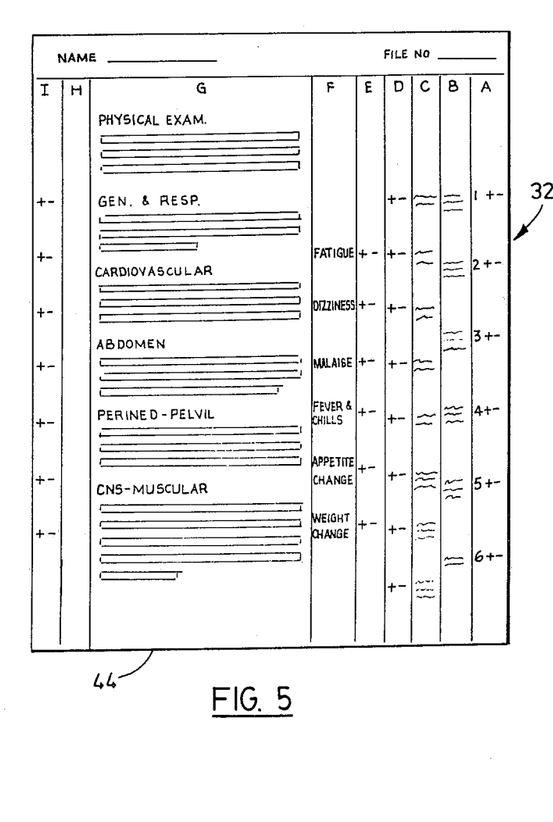
FIG. 5 is a plan view showing the general arrangement of the preferred answer sheet.

Arranged below the three question sheets is at least one answer sheet 32 on which the answers to all of the questions on the question sheets can be indicated. Only the right hand edge portion of the answer sheet 32 can be seen in FIG. 1. An example of a complete answer sheet is shown in FIG. 5 of the drawings. As can be seen from the latter figure, the answer sheet 32 is divided into a number of columns. In the illustrated preferred answer sheet there are in fact 9 columns and for purposes of the present description these columns have been labeled A to I starting with the right hand column and shifting over to the left hand column. Column A has indicia thereon for providing answers at desired locations to the questions set out on sheet 12. A "Yes" answer to question number 1 is indicated by circling the plus or positive sign at 58. A "No" answer is indicated by circling the negative sign at 59. It is preferable to use plus and negative signs on the answer sheet rather than "Yes" and "No" in order that the same answer sheets can be used by patients no matter what their languages may be. It is felt that the proper use of the + and − signs will be understood by most users of the system and this use can be fully explained in an introductory paragraph (not shown). It will be appreciated however that other means such as numbers can be employed to indicate the answers. For example, the number 1 could indicate "yes", the number 2 could indicate "no" and the number 3 could indicate "not sure" or "do not know". Alternatively three or more letters of the alphabet might be employed for this purpose. If the letters "a" to "e" are used on the answer sheet, each letter can be used to represent one of five possible answers to the question. Each of these answers would be provided on the question sheet next to its respective letter.

Figure 1:
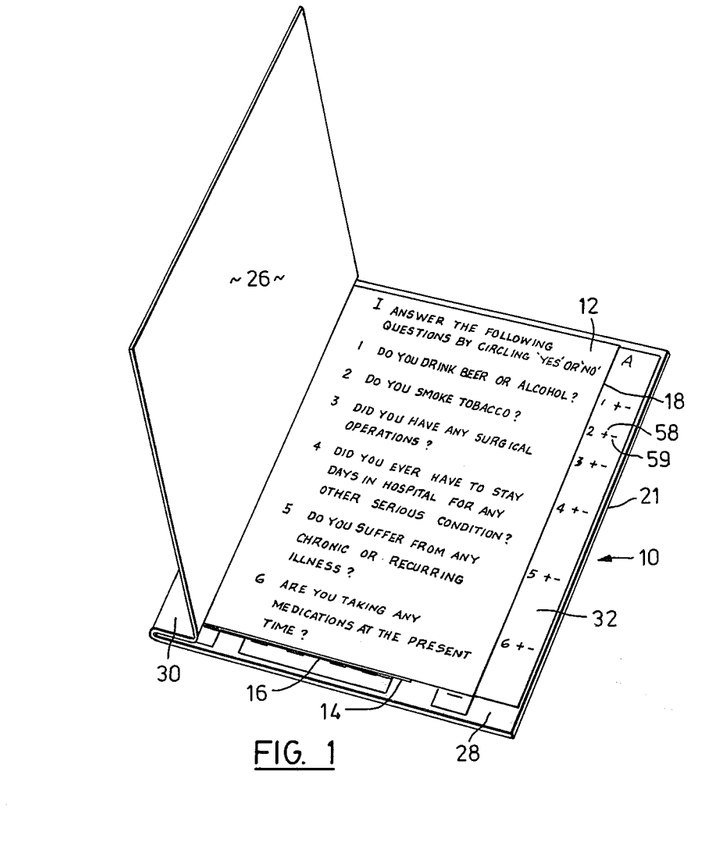
FIG. 1 is a perspective view of a first embodiment of an information gathering system contructed in accordance with the present invention, the first question sheet being shown in this view.
Figure 6:
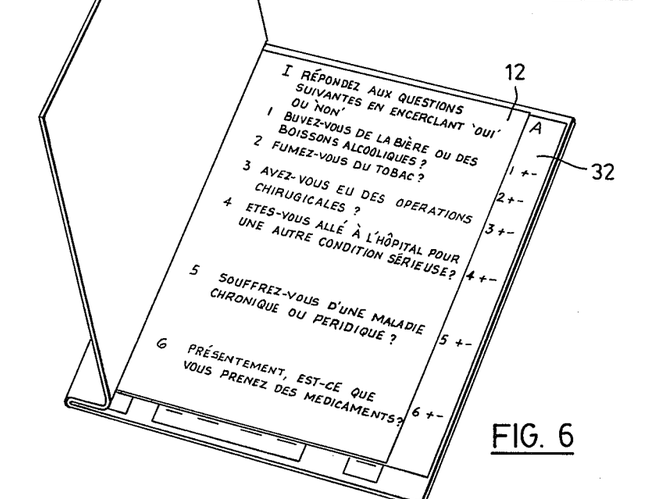
FIG. 6 is a view similar to FIG. 1 but showing the first question sheet written in a different language.

The questions on the question sheets 12, 14, and 16 are, of course, in the language of the person answering the question. However, the doctor or other medical person receiving the answer sheet does not have to understand the language of the patient in order to understand the answers that have been given provided the answer sheet is written in the doctor's language and universal symbols are used to indicate the answers. In FIG. 1 there is shown a question sheet 12 with the six questions appearing thereon written in the English language. To illustrate the use of another language, FIG. 6 shows the question sheet 12 with the same questions written in the French language. The answer sheet 32 that is used can be identical and written in the one language spoken by the doctor, for example English. The answer sheet could also be in a lanaguage not usually used in the region. Such a sheet might be used to accommodate a foreign doctor or an international associate.

Figure 2:
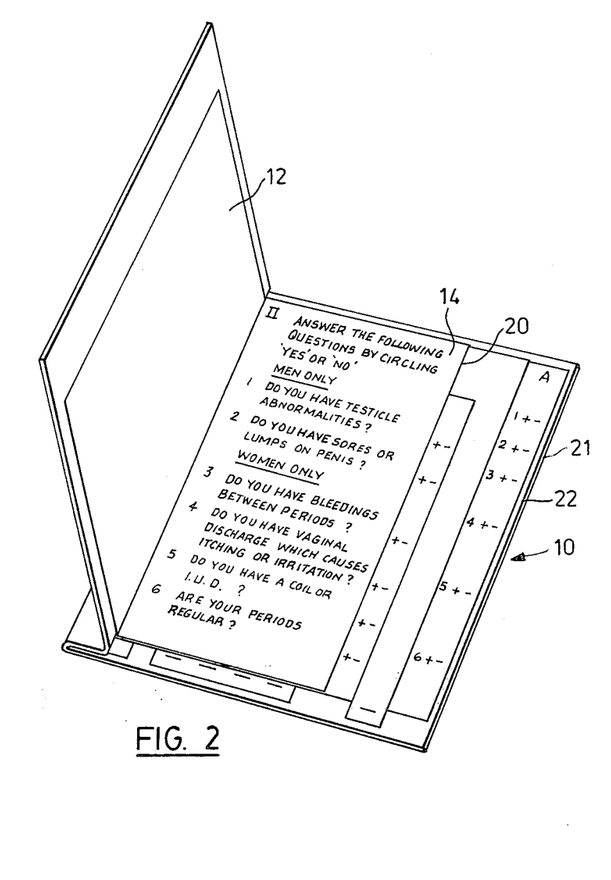
FIG. 2 is a perspective view similar to FIG. 1 but showing the first question sheet raised to expose the second question sheet.

Referring now to FIG. 2 of the drawings, the top question sheet 12 has been lifted and is being held against the front cover 26. Now the patient or reader can answer a second set of questions that are listed on the sheet 14. Again the answer to each question is indicated by circling either a plus sign or a negative sign or some other symbol explained in the introduction. The indicia for the answers to the questions on the sheet 14 are located immediately to the right of the right hand edge 20 and they are on the same answer sheet 32. The indicia for the sheet 14 are set out in column D shown in FIG. 5. Although not shown in FIG. 2, the number of the question to which the answer relates can also be shown in column D if desired. Preferably the number of the question is immediately to the right of the negative sign. If the question numbers are used on the answer sheet, it is easy to correlate the answer with its question even when the answer sheet has been removed from its underlying position.

Figure 3:
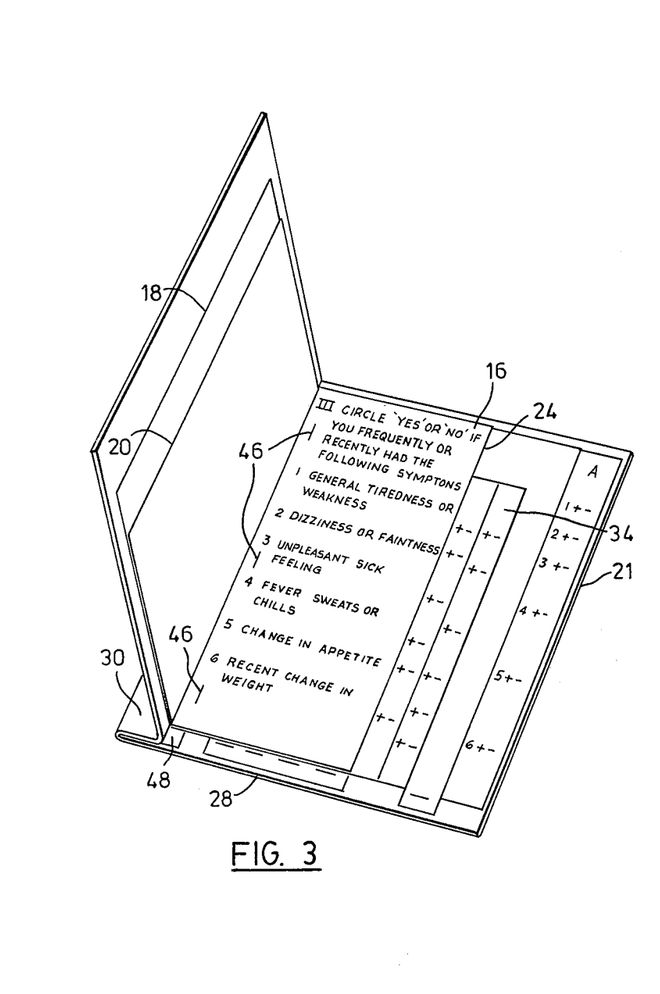
FIG. 3 is a perspective view similar to FIG. 1 but showing both the first and second question sheets raised to expose the third question sheet.

In FIG. 3 the second question sheet 14 has been lifted and rests against the back of the first question sheet. The patient now answers the questions listed on the third sheet 16. Another column of positive and negative signs is provided immediately to the right of the right hand edge 24. These indicia are those found in column E of the answer sheet shown in FIG. 5. If desired the number of each question to which the answer relates can be shown in column E as well and preferably this number would appear immediately to the left of the positive sign. These numbers have not been shown in the drawing in order that the drawings can be of a reasonable size while at the same time not being unduly difficult to read and understand. It will be appreciated however that the question numbers can be placed anywhere that is convenient and that will not be misunderstood. With the second sheet 14 lifted to the position shown in FIG. 3, all of an elongate cut-out 34 is exposed. As can be seen from FIG. 4, this cut-out is formed in a front section or overlying part 36 of a sheet-receiving pocket 38. This pocket 38 provides means for positioning and holding the answer sheet 32 in a correct underlying position relative to the question sheets 12, 14, and 16. If the answer sheet 32 is properly placed in this pocket, the questions will be aligned with the corresponding sections on the answer sheet 32 for the answers to the questions. In the illustrated embodiment the back cover 28 of the folder forms the back part or rear section of the pocket 38. The front section 36 of the pocket is joined to the back cover in the region of the bottom edge 40. This can be done by means of carefully positioned staples if the pocket is made of paper or Bristol board material. Alternatively if the pocket is made of suitable plastic sheets, a heat seal could be used to join the front section to the back cover along the bottom edge. The staples 42 should be located in such a manner that the answer sheet 32 will be in the proper underlying position for the answering of questions when the bottom edge 44 of the answer sheet is pushed down so as to rest against the staples. In order to position the left hand edge of the answer sheet 32 correctly the vertically aligned staples 46 shown in FIG. 3 can be used. In FIG. 3 three of these staples are shown but fewer can be used in practice. These staples extend through the third question sheet 16, the front section 36 of the pocket and the back cover 28. If these staples are properly inserted at the correct locations, the left hand edge of the answer sheet will be properly located when it is forced up against these staples. Alternatively the staples 46 can be so positioned that there is no gap between the front section 36 and the back cover 28 in the region of the strip 48 which is part of the front section. The strip 48 extends from the top to the bottom of the front section and it extends into the edge portion 30 of the folder. If the staples 46 are positioned so that they extend through the strip 48, the strip 48 itself will act as a stop for the left hand edge of the answer sheet.

Figure 4:
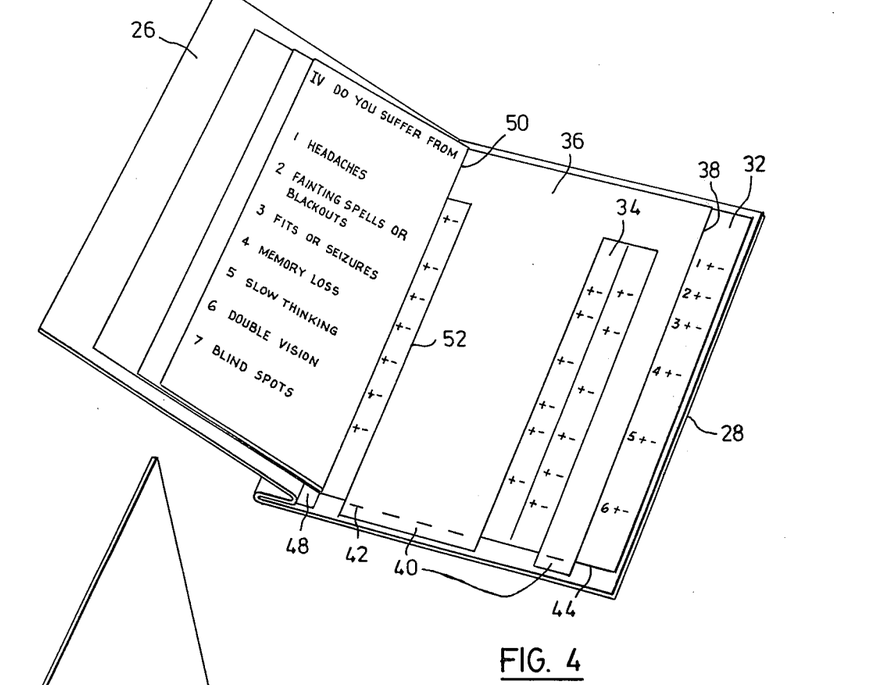
FIG. 4 is a perspective view wherein all three question sheets have been raised and folded back so as to reveal questions on the back of the third question sheet.

In FIG. 4 of the drawings, the third question sheet 16 has been lifted and folded back to reveal a fourth set of questions on the back of the sheet 16. The answers to these questions are provided by circling a positive or negative sign located immediately to the right of the fold 50 in the sheet 16. The positive and negative signs used are those in column I shown in FIG. 5. This column is revealed by means of a second cut-out 52 in the front section 36. Each elongate cut-out 34 and 52 extends substantially the length of the front section 36. It will be appreciated that neither cut-out need extend right to the bottom of the section 36 (see example the cut-outs shown in FIG. 11). Again the question numbers can be provided on the answer sheet beside the appropriate answer signs. In some applications it is possible that the same number of questions would be placed on each of the question sheets. In such cases only one row of question numbers on the answer sheet may be required. It might also be noted here that the question and answer sheets could be made wider than the ones shown. For example, a width greater than the standard 8½" could be used for the first question sheet 12, particularly if this is required to accommodate more verbose languages.

The purpose of the other columns B, C, F, G, and H appearing on the answer sheet shown in FIG. 5 will now be explained. In column B there is written beside the answer to each question a brief written description of the answer in the language of the doctor or other medical personnel who will be reading the sheet. Column B provides information concerning the answer indicated by circling the positive or negative sign in Column A. Similarly column C provides information in the language of the doctor concerning the answer that has been indicated by circling the positive or negative sign in column D. It will be appreciated that standard answer sheets could be printed up in a number of different languages by a supplier. The doctor would order those sheets written in the language that he knows or that he is most comfortable with.

Column F provides written information in the language of the doctor concerning the symbolic answer provided by the patient in column E. The wide column G is a general health information column that can be used in any desired manner to record additional information that has not been provided by the answers to the questions set out on sheets 12, 14, and 16. The doctor employing the information gathering system of this invention can have this column printed up according to any format that suits his practice. In the example shown in FIG. 5 column G is being used to record information gathered as a result of a physical examination conducted by the doctor. Finally column H provides a written information concerning the symbolic answer that has been indicated in column I.

The answer sheets can be printed up and a number of them detachably connected together. Single answer sheets can then be torn off or separated from the group as they are required. In order to save paper, the answer sheets could be printed on both sides. The back side could then be used by the same person at a later time or by another person possibly.

The front section 36 of the pocket can be made from stiff paper or an opaque plastic sheet. The front section should preferably be opaque rather than clear in order to block out the sections on the answer sheet intended for only the doctor's use. It is felt to be desirable to block out those portions which the patient need not read in order that the patient will not be confused or distracted by this reading matter and will concentrate on the answers to be given. The back of the pocket is preferably made from a stiff paperboard material since it also forms the back cover for the preferred folder 22. If the back part 28 is made of this material, then the front section 36 can be readily and securely attached to the back part 28 by the aforementioned staples 42.

Figures 7, 8, 9, 10, 11:
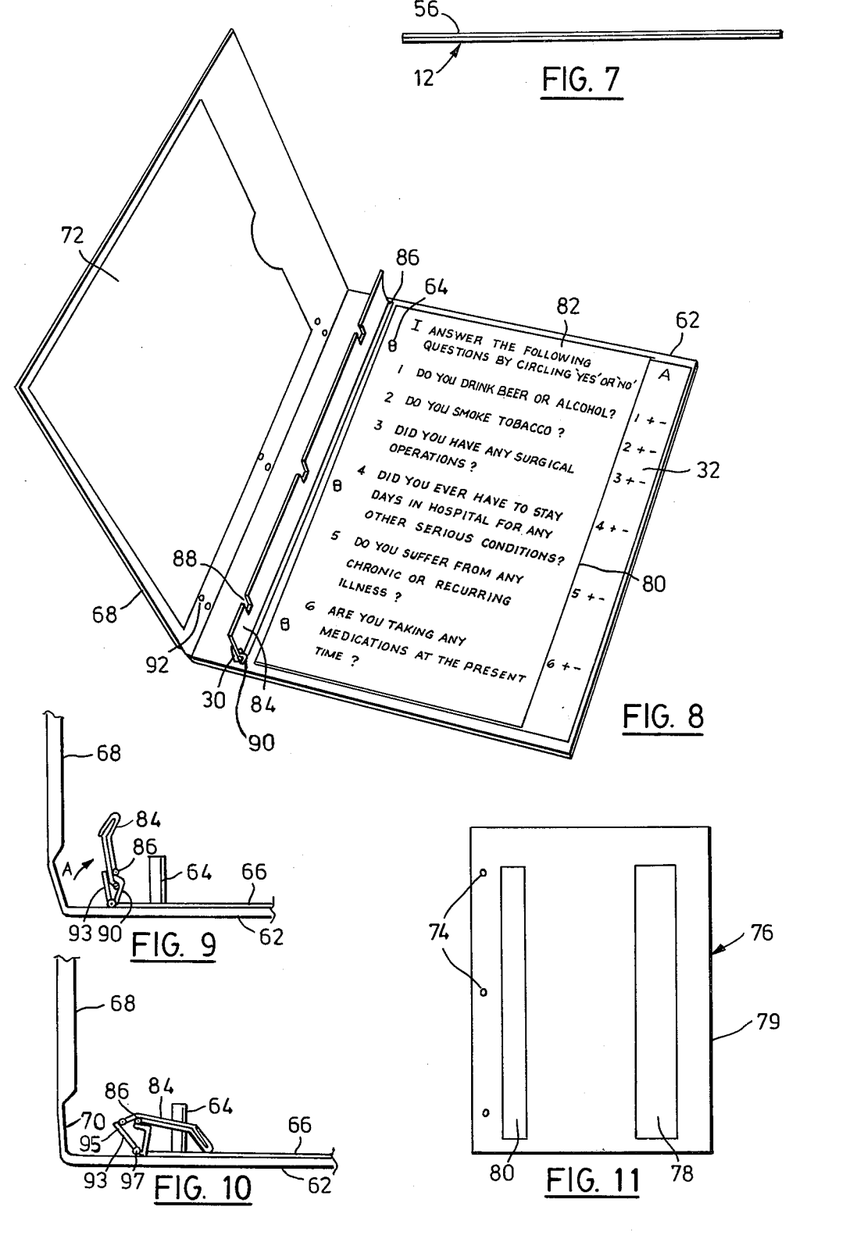
FIG. 7 is an edge view of the top question sheet only showing its two layer contruction.
FIG. 8 is a perspective view of a second preferred embodiment of an information gathering system constructed in accordance with the invention.
FIG. 9 is a detail view of the clamp that can be used in the embodiment of FIG. 8.
FIG. 10 is a detail view similar to FIG. 9 showing the clamp in the clamping position.
FIG. 11 is a plan view of an insert sheet which can be used with the embodiment of FIG. 8.

Because more than one answer sheet 32 can be employed with each set of question sheets, the question sheets 12, 14, and 16 are preferably covered with a plastic coating in a well known manner so that they can withstand repeated handling without becoming unduly soiled. The plastic coating also helps to prevent the question sheets from being inadvertently torn or folded improperly. The plastic coating on the question sheet 12 is shown in FIG. 7. The coating 56 is applied to the front surface of the question sheet and it covers the entire surface. If desired, a plastic coating could also be placed on the back of the question sheet, particularly when there is additional information or questions printed on the back of the sheet. Alternatively, the question sheets can be made entirely of plastic sheets or a similar durable material. In such a case, the questions can be embossed on the sheets.

A preferred system for positioning and holding the question and answer sheets used with the present invention is shown in FIGS. 8 and 9. With this system the means for positioning and holding the answer sheet 32 in a correct underlying position relative to the question sheets comprises a peg board 62 having a row of pegs 64 along one side thereof. In the illustrated embodiment there are only three pegs and these are located so as to fit through holes in a sheet adapted for insertion in a standard three ring binder. It will be appreciated however that a greater number of pegs could be used along one side of the board if desired. For example, a peg board currently in use has nine pegs evenly spaced along the left hand margin of the board and a similar number of pegs could be used with the system of the present invention. The pegs can project from a metal sheet 66 forming the upper surface of the board 62. The back surface or bottom surface of the board 62 can be made of a different material such as plastic or a sheet of cardboard covered by a layer of plastic. The illustrated peg board is also provided with a front cover 68 which again can be made of plastics or other hard material or a sheet of cardboard or Bristol board covered with a plastics material. The peg board and the front cover 68 are connected by means of a flexible plastic web or hinge 70. This web is sufficiently flexible that the front cover 68 can be pivoted counterclockwise 360 degrees from the position shown in FIG. 9 to a position immediately beneath the peg board 62. This position may be particularly convenient for use when the questions are being answered by the patient. On the inside surface of the illustrated front cover 68, a pocket 72 is provided for possibly holding further answer sheets or an alternative set of question sheets. In order to employ the illustrated peg board as part of an information gathering system constructed in accordance with the invention, the answer sheet 32 is first placed on the pegs 64. This answer sheet has peg receiving holes similar to the three holes 74 shown in FIG. 11. Because the holes are the same size as the cross section of the pegs 64, the answer sheet is firmly held at the proper position on the board. When the answer sheet is in place, an insert sheet 76 is then placed on the peg board. This sheet is shown in FIG. 11 and it can be made of an opaque plastic material, Bristol board, or some other durable material. The pegs 64 project through the three holes 74 provided along the left hand margin of this sheet. Again because of the close fit between these holes and the pegs, the insert sheet is firmly held in the proper position. When installed on the board, the right hand edge 79 of the sheet is located at the position indicated by the reference 80 in FIG. 8. Accordingly, the answer sheet is only partially covered by the sheet 76. The column A is left exposed as in the first embodiment shown in FIG. 1. The insert sheet 76 also has elongate cut-outs 78 and 80, both of which extend most of the length of the sheet. These cut-outs or windows serve the same purpose as the cut-outs 34 and 52 of the first embodiment. Unlike the cut-outs 34 and 52, they do not extend right to the bottom of the sheet 76. Instead the bottom of each cut-out is spaced a short distance above the bottom of the sheet.

After the insert sheet 76 is in place, the question sheets can be placed on the peg board and they are fitted on the pegs 64 in the same manner as the answer sheet 32 and the insert sheet 76. Thus each question sheet including the top sheet 82 has three peg receiving holes along its left hand margin. It will be appreciated that the question sheets can be assembled and supplied in attached booklets each having all of the required sheets. An insert sheet 76 could be attached to each booklet or it can be a separate item. The use of booklets makes it easy to insert a new set of sheets written in any desired language.

If desired, a spring loaded clamp 84 can be used to ensure that the sheets do not come loose or fall off of the pegs 64. The illustrated clamp has an elongate hinge 86 extending the length of the clamp. A spring mechanism 93 can be used to bias this clamp towards the position shown in FIG. 10. The spring mechanism 93 includes a pivoting plate 95 that is connected by an elongate hinge 97 to the metal plate 66. Coil springs (not shown) are arranged along the length of the hinge 97 and they bias the plate 95 in the clockwise direction indicated by the arrow A. The spring mechanism 93 provides an over-centre biasing device for the clamp for the purpose indicated below. The clamp and its associated spring mechanism are constructed in a well known manner and can for example be constructed in a manner similar to the clamping device used on peg boards sold under the trade mark McBEE by Litton Industries. If the pegs 64 are made quite long so they can hold a number of sheets at one time, then three gaps or openings 88 can be formed in the clamp 84 to permit the pegs to project through the clamp when it is swung to the position shown in FIG. 10. The hinge 86 for the clamp is fastened to the metal sheet 66 by means of an L-shaped support 90. The support 90 can extend the entire length of the hinge and it can be an integral extension of the metal sheet if desired. It will be appreciated that the use of the clamp 84 is entirely optional and such clamps are often not employed with peg boards. It is felt however that the use of such a clamp could be advantageous with the system of the present invention because the question sheets are designed for repeated use. Accordingly, the three holes in each of the question sheets and the holes 74 in the insert sheet may become worn or may be enlargened after repeated use and, if this occurs, the clamp 84 will prevent these sheets from falling off of the pegs 64.

The clamp 84 is designed to remain in an open position while the answer and question sheets are being placed on the pegs. The spring mechanism 93 will bias the clamp 84 towards the open position when the clamp 84 has been swung counterclockwise from the position shown in FIG. 10 to that shown in FIG. 9.

If desired, the pegs 64 could be made fairly long i.e. one-half inch to three-quarters of an inch in order that these pegs can accommodate a large number of sheets. In this way a number of answer sheets 32 can be placed initially on the peg 64. Only the top answer sheet would be used initially and the other answer sheets are simply stored on the peg board. After the first answer sheet has been used, the question sheets and the insert sheet 76 are removed from the pegs to permit removal of the top answer sheet. The insert sheet 76 and the question sheets, either as a booklet or as separate sheets, are then placed back on the pegs and the second answer sheet, which is now the top one, is used by the next patient. Of course if the longer pegs are used, the flexible web 70 must be made wide enough to accommodate the longer pegs and to permit the front cover to be closed. Instead of this system for removing answer sheets, the answer sheets can have tear lines formed by perforations extending vertically near their left hand edges and to the right of the pegs. In this way, one can tear out the top answer sheet after it has been answered. This method avoids any need to remove and reattach the insert sheet and the question sheets after each use of the device.

If desired, a pair of holes 92 can be provided at each of three locations along the flexible web 70. These holes are designed to accommodate the three rings of a three ring binder. In this way, the complete folder comprising the peg board 62, its front cover 68, and the material placed on the peg board can be held in a three ring binder along with other folders. This feature can usefully be employed where the system is being used to provide question sheets in a variety of languages as explained hereinafter.

It will be seen that this preferred system of the invention has components that can be readily separated. It is therefore possible to replace individual components without replacing the entire package. The replacable components include the peg board unit, the answer sheets, and the question sheets.

Doctors are often called upon to treat patients who communicate in a language not known to the doctors. This is particularly true in emergency situations where there is not sufficient time to arrange for a doctor who can speak the patient's language to attend to his treatment. In the past such patients have often had to rely on a relative or friend who can translate for them. It will be appreciated however that such relatives or friends are some times unavailable for various reasons and depending upon the rarity of the language in the region where the patient is located, it may be difficult for a doctor or his nurse to locate a translator. Moreover even if a translator is available, a heavy onus is placed on the translator to provide an accurate and complete translation since often the proper treatment of the patient will depend on it. The information gathering system of the invention can overcome some of these difficulties by providing a means for a doctor to quickly gather essential medical information from a patient who does not communicate in the doctor's language. With the present system a doctor or hospital can have a set of question sheets written in each of the languages that is likely to be spoken or read by any patient that the doctor or hospital encounters. The question sheets will set out a number of standard questions, the answers to which will provide the vital information required to treat a patient. Only one form of corresponding answer sheet need be kept by the doctor or hospital and this sheet is of course written in the language of the doctor or in the language of communication used at the hospital. The number of this one form of answer sheet kept by the doctor or by the hospital would depend upon the frequency with which they are used, bearing in mind that it is necessary to have one answer sheet for each patient answering a set of the question sheets.

Because an answer sheet written in one language can be used with question sheets written in a variety of languages, the indicia on the answer sheet for providing answers at certain desired locations are preferably written in a form, the meaning of which would be known to most persons whatever their language might be.

In the illustrated embodiments, there are only about 6 to 7 questions indicated on each question sheet. The number of questions illustrated have been kept to a minimum in order to simplify the drawings and in order that the drawings will not be unduly large. It will be appreciated however that each question sheet could have up to 50 or more questions printed thereon. The number of questions that can be printed on a single question sheet will depend to some extent of course on the size of the question sheet and the size of type desired.

If the answer sheet is written in a language different from the question sheet with which it might be used, it is desirable that the front section 36 of the pocket block out those portions of the answer sheet written in a language different from that used on the question sheets. As already indicated, it is believed that the use of opaque front section 36 also helps to avoid confusion in the mind of the patient. If the answer sheet is of the type shown in FIG. 5, the front section 36 will cover up the information in columns, B, C, D, F, and H which concerns the answers indicated in the adjacent columns. The front section will also cover up column G which is for use by the doctor only and which also is in his language. The front section 36 or the insert sheet 76 can be entirely blank if desired. However it could have suitable writing thereon in some circumstances. For example, it might have information written in the language of the interpreter. The information might be abbreviated to save space. It might be provided with figures or symbols to indicate the corresponding position on an audio tape or video tape or in a computer for the particular questions. The written material could also be a combination of these.

If desired the question and answer sheets can be provided with blank spaces below the printed questions and possible answers thereto. Also blank spaces could be provided between groups of questions if desired. The blank spaces on the question sheets would also have numbers along the left hand margin and these numbers could be a continuation of the numbering used for the printed questions. A doctor using these question sheets could write or type in "personalized" questions which are either particularly suited for the type of practice carried on by him or which he feels are suitable and necessary questions for a certain type of patient. The possible answer or answers to each of these questions would also be written in or typed in by the doctor or his assistant in the blank space provided on the answer sheet for these answers. Again suitable numbering could be provided along one side of the blank space for use with the additional answers. Also pre-printed indicia (+, −, etc.) can be set out on the answer sheet along side of the blank space or blank spaces.

Sometimes physicians need to consult with experts or specialists in a particular area of medicine. For example, a physician located in a remote area who does not have expertise concerning a particular ailment or injury might wish to consult with a specialist in a certain city. If this physican is using the present information gathering system, he may wish to provide the answers set out on the answer sheet to the specialist. It will be appreciated that the answer sheet used in the system of the present invention can be constructed in such a way that it can be read by a computer or by a machine capable of sending the answers by telex. If the answer sheet is ready by a computer, the information could then be fed to another computer located in the city where the specialist practices. The required connection between the computers might, for example, be provided by a suitable telephone hook-up.

It should also be appreciated that there are ways other than that shown in the drawings of this application for a person to indicate an answer on the answer sheet of the information gathering system. For example if it is desirable to have a record of the indicated answer both on the question sheet and on the answer sheet, a sheet of carbon paper can be placed over the answer sheet to permit a transfer of the answer to the answer sheet. When carbon paper is used in this way, the section on the question sheet for indicating the answer, by a pencil mark or otherwise, will be positioned immediately over the corresponding section of the answer sheet for the answers to the questions. Instead of carbon paper, other forms of chemical transfers can be used to copy the answer indicated on the question sheet onto the answer sheet as well.

Figure 12:
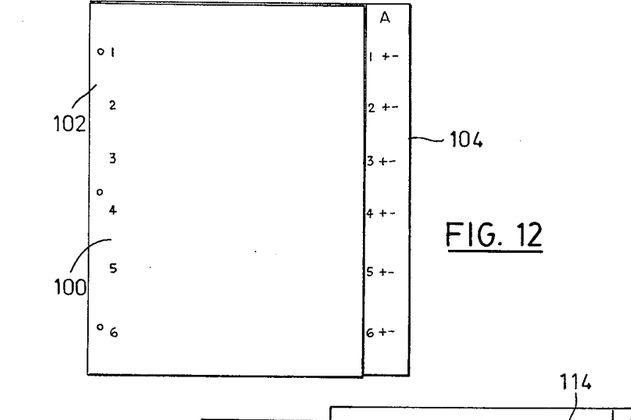
FIG. 12 is a plan view of a blank question sheet overlying the answer sheet of FIG. 5.
Figure 13:
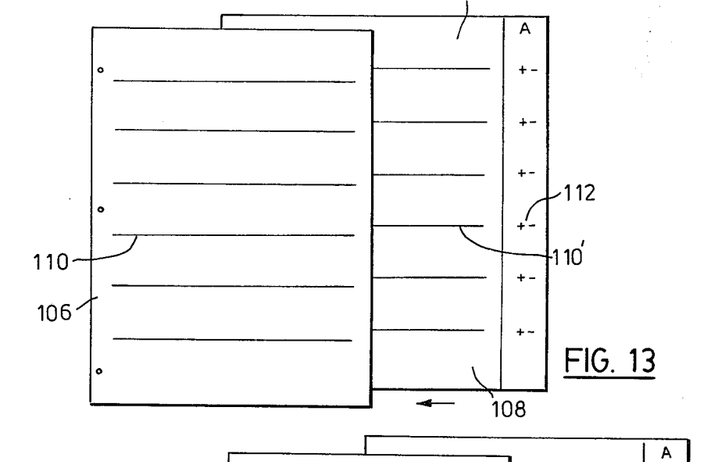
FIG. 13 is a plan view of an alternative form of blank question sheet and a blank sheet for answers with the underlying sheet being shifted to the right for purposes of illustration.
Figure 14:
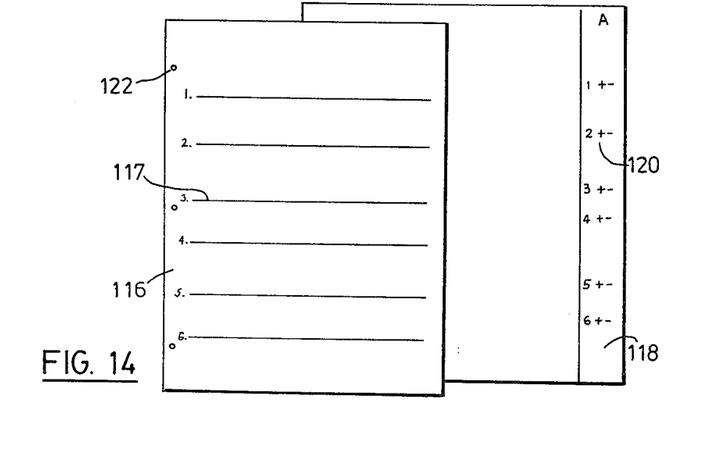
FIG. 14 is a plan view similar to FIG. 13 but showing another embodiment of blank question and answer sheets.

As illustrated in FIGS. 12 to 14, it is also possible to employ blank or substantially blank question and/or answer sheets with the system of the present invention. For example, the first sheet 100 shown in FIG. 12 is for the listing of questions in an particular language. This first sheet is essentially blank except for indicia 102 in the form of numbers in a vertical column along the left hand margin. These numbers indicate the appropriate locations for questions to be listed on the sheet 100. The underlying second sheet 104 is an answer sheet printed up in the same manner as the sheet 32 shown in FIG. 5. Alternatively this answer sheet 104 could have two columns only. These columns would comprise the column A shown in FIG. 12 and a second column taking up the rest of the sheet 104 and providing necessary information concerning the answer indicated in column A. The sheets 100 and 104 can be used in conjunction with the peg board 62 shown in FIG. 8 and such use thereof is preferred. However it is possible that the sheets 100 and 102 could be used by themselves in the manner shown provided the patient is careful to keep the answer sheet 104 in the proper underlying position.

It will be understood that the system shown in FIG. 12 is intended for use when a doctor or other person using this system encounters a person that speaks a language for which he has no prepared question sheets. If this person has an interpreter with him or if he can obtain the services of an interpreter, the interpreter can prepare a question sheet for him with the use of the blank sheet 100. It will be understood that the interpreter would be provided with a complete question sheet such as the sheet 12 shown in FIG. 1 for the preparation of the translation. If desired, the blank sheet 100 shown in FIG. 12 could have a short explanatory paragraph printed thereon to explain to the interpreter how the sheet is to be completed.

In the embodiment shown in FIG. 13 both the first sheet 106 and the underlying second sheet 108 are substantially blank except for horizontal lines 110 placed thereon. With the use of this system a doctor or other interviewer can formulate and set out his own questions to be answered. In this way the system of the invention can be "customized" to suit the needs of the individual practitioner or the needs of a specialist. Each question is listed on one of the lines 110 on the sheet 106. The information regarding each answer is set out on a corresponding line 110' on the second sheet 108. The second sheet 108 has predetermined, marked locations where the answers to the questions can be indicated. These locations can be marked by means of the indicia 112 which, in the illustrated embodiment, consists of plus and minus signs. As in the previous embodiments, these signs can be arranged in a vertical column along the right hand margin. Again the sheets 106 and 108 can be provided with suitable holes along their left hand margins for placement of the sheets on a peg board 62. It will be understood that the indicia is aligned horizontally with the lines 110 on the sheet 108 so that there will be no confusion as to what information in the region 114 applied to the answer that has been indicated by circling the plus or the minus sign. One advantage of the blank sheets shown in FIG. 13 is that they can readily be used to add on additional questions and possible answers thereto to a prepared list or lists of questions and answers. The question and answer numbers placed on the sheets 106 and 108 will then be a continuation of the numbering on the sheets of standard questions and related possible answers.

Another possible form of question and answer sheets is shown in FIG. 14. In this embodiment, the first sheet 116 is lined at 117 and the lines are numbered. As on the question sheets shown in FIGS. 12 and 13, a doctor or other interviewer can list his own set of questions on this first sheet. The second sheet 118 is again for listing possible answers to the questions set out on the first sheet 116. The second sheet has indicia 120 thereon for providing answers at predetermined locations, in this case in a vertical column along the right hand margin. The second sheet 118 is also provided with numbers corresponding to those on the first sheet 116. With the use of these numbers, it is easy to list the required interpretive information for a given answer at the correct location. The use of numbers on the answer sheet also helps to ensure that the sheet 118 is placed in a proper underlying position relative to the top sheet 116. Otherwise the second sheet 118 can be substantially blank. If desired the answer numbers on the sheet 118 can be placed along the left hand margin of the sheet instead of the location shown. Preferably the sheets 116 and 118 are also provided with holes 122 so that the sheets can be placed on a peg board 62. It will however be appreciated that the sheets 116 and 118 could be used without a peg board if one is not readily available or if for some reason one does not wish to have the answer sheet 118 underlie the first sheet 116 when the questions are being answered. It is of course quite possible to answer the questions without having the second sheet 118 in any particular position relative to the first sheet 116 if the location for the answers are numbered. The numbering system will then indicate the correct location for each possible answer to a question.

It will be appreciated that other modifications can be made to the information gathering system of the invention without departing from the spirit and scope thereof. For example, other devices could be used if desired for holding the answer sheet in a correct underlying position relative to the question sheet. Also the system can be manufactured in various sizes including a pocketbook size that could easily be carried by a doctor making house calls or making his rounds at a hospital.

What I claimed is:

1. An information gathering system comprising:
    a plurality of question sheets each bearing a different set of questions, said question sheets being superimposed one on top of another and arranged so that one edge of each underlying question sheet is positioned inwardly a predetermined distance from the corresponding edge of the overlying sheet;
    means for holding said question sheets in said superimposed position;
    a separate answer sheet on which answers to all the questions on all said question sheets can be indicated at predetermined marked locations, interpretive information regarding each possible answer being provided on the answer sheet adjacent the predetermined location for the answer; and
    means for releasably positioning and holding said answer sheet in a correct underlying position relative to said question sheets so that the questions are aligned with the locations on said answer sheet for the answers to said questions.

2. An information gathering system as claimed in claim 1, which includes at least one additional blank question sheet, on which questions can be marked.

3. An information gathering system as claimed in claim 1, which includes at least one blank answer sheet, on which can be marked interpretive information for additional questions.

4. An information gathering system as claimed in claim 1, which includes an additional question sheet and an additional answer sheet, which are provided with numbers, for additional questions and answers, but are otherwise blank.

5. An information gathering system according to claim 1 wherein said positioning and holding means comprises a sheet-receiving pocket, said question sheets being attached to said positioning and holding means at one side edge of each question sheet and being located in a position overlying said pocket.

6. An information gathering system according to claim 5 wherein said pocket is made of stiff paper material.

7. An information gathering system according to claim 5 or 6 wherein a part of said pocket is adapted to be positioned in front of said answer sheet and has cut-outs formed therein to reveal selected portions of said answer sheet when the latter is positioned in said correct underlying position.

8. An information gathering system according to claim 1, 5 or 6 wherein said question sheets are made of paper covered with a plastic coating.

9. An information gathering system according to claim 5 or 6 wherein said question sheets are attached at their left side edges to said positioning and holding means and the turning of each question sheet, except the bottom one, about its left hand margin reveals the answer locations on said answer sheet for the next underlying question sheet.

10. An information gathering system according to claim 1 or 5 wherein said answer sheet is written in one language and said question sheets indicate the questions in a different language.

11. An information gathering system according to claim 1 or 5 wherein said answer sheet has vertical columns of indicia that can be marked by the person answering the questions, there being a group of two or more symbols or numbers on said answer sheet for each question on the question sheets.

12. An information gathering system according to claim 5 wherein said pocket includes an overlying part adapted to overlie said answer sheet, said overlying part having at least one elongate cut-out extending lengthwise of said pocket said cut-out revealing a selected portion of said answer sheet when the latter is positioned in said correct underlying position.

13. An information gathering system according to claim 1 wherein said positioning and holding means comprises a peg board having a row of pegs along one side thereof, said question and answer sheets having peg receiving holes formed along at least one edge thereof.

14. An information gathering system according to claim 13 including an insert sheet underlying said question sheets and partially covering said answer sheet, said insert sheet having peg receiving holes formed along at least one edge thereof.

15. An information gathering system according to claim 14 wherein said insert sheet has at least one elongate cut-out formed therein to reveal at least a portion of said marked locations for answers on said answer sheet.

16. An information gathering system according to claim 13, 14 or 15 wherein said questions are written in one language and said answer sheet indicates the answers to the questions in a different language.

17. An information gathering system comprising:
    question sheets having lists of questions in one language thereon, said question sheets being arranged one on top of another and positioned so that one edge of each underlying question sheet is positioned inwardly a predetermined distance from the corresponding edge of the immediately overlying sheet;
    means for holding said question sheets in the aforementioned position and also permitting at least an overlying question sheet to be turned to expose an underlying question sheet;
    an answer sheet on which answers to questions on all said question sheets can be indicated, interpretive information regarding the answers being provided on said answer sheet in another language, said answer sheet also having indicia thereon for providing answers at desired locations on said answer sheet; and
    means for releasably retaining said answer sheet in a correct underlying position relative to said question sheets so that the questions are aligned with corresponding sections on said answer sheets for the answers to said questions.

18. An information gathering system according to claim 17 wherein said retaining means comprises a pocket with a front section having elongate openings formed therein to reveal the portions of said answer sheet having said indicia thereon.

19. An information gathering system according to claim 18 wherein said front section covers up the information regarding the answers set out in said another language.

20. An information gathering system according to claim 17, 18 or 19 wherein said holding means comprises means for fastening together one edge of said question sheets.

21. An information gathering system according to claim 17, 18 or 19 wherein said question sheets are made of paper coated with a protective durable material.

22. An information gathering system according to claim 17, 18 or 19 wherein the indicia for providing answers on said answer sheet are set out in vertical columns, a first column being located adjacent the right hand edge of said answer sheet and a second column being spaced inwardly from said first column, at least part of said information regarding the answers being set out between said first and second columns.

23. An information gathering system according to claim 17 wherein said retaining means comprises a peg board having a row of pegs along one side thereof, said question and answer sheets having peg receiving holes formed along at least one edge thereof.

24. An information gathering system according to claim 23 including an insert sheet underlying said question sheets and partially covering said answer sheet, said insert sheet having peg receiving holes formed along at least one edge thereof.

25. An information gathering system according to claim 24 wherein said insert sheet has at least one elongate cut-out formed therein to reveal at least a portion of said indicia for providing answers on said answer sheet.

26. An information gathering system according to claim 1 or 17 including a number of question sheets each having the same list of questions thereon and each written in a language different than the languages used on the other question sheets, the languages on said question sheets including braille and phonetic renditions of one or more languages.

27. An information gathering system according to claim 1 or 17 or 26 wherein the answers to the questions provide diagnostic, medical or other information concerning the person providing the answers.

28. An information gathering system according to claim 1, 5 or 6 wherein each of said question sheet, answer sheet, and said positioning and holding means are completely detachable from the other components of the system and can be replaced individually if or when required.

* * * * *